May 14, 1940.  E. W. MADGE ET AL  2,200,847
PROCESS OF VULCANIZING SPONGE RUBBER
Filed Dec. 10, 1937
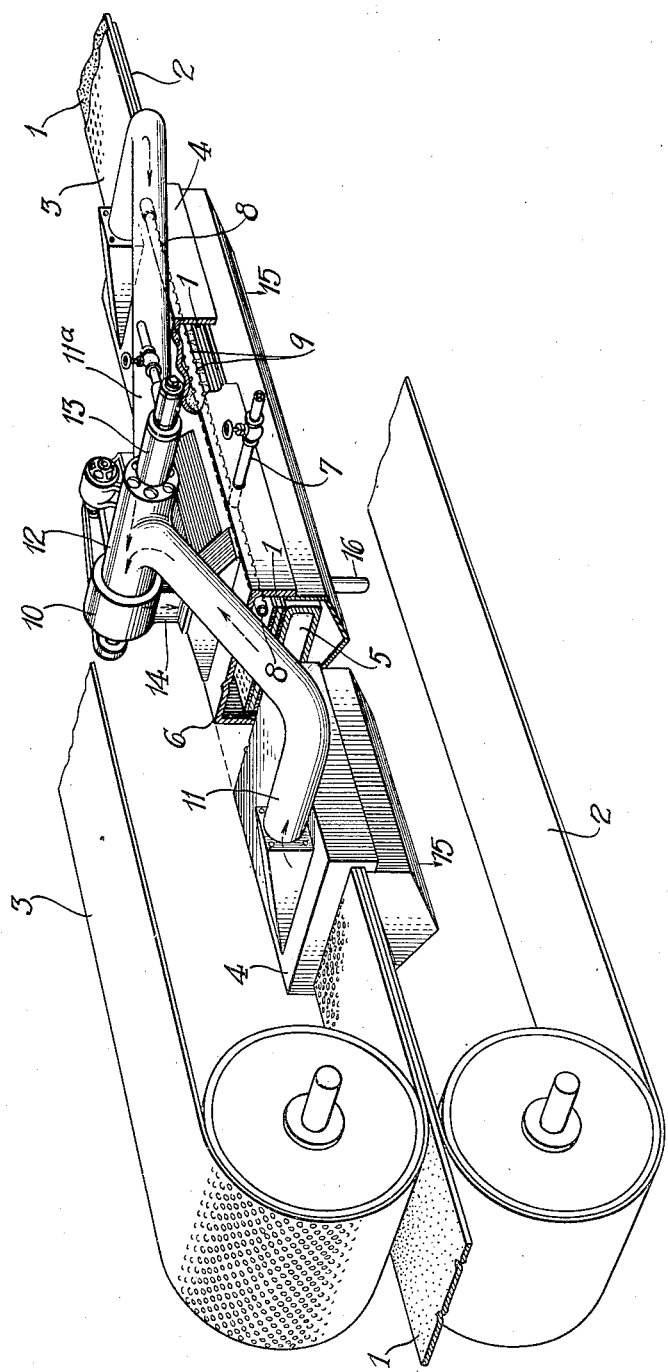
INVENTORS
EVELYN WILLIAM MADGE.
ALBERT ARTHUR ROUND.
THOMAS NORCROSS.
BY Benj. T. Rauber ATTORNEY.

Patented May 14, 1940

2,200,847

UNITED STATES PATENT OFFICE 2,200,847

PROCESS OF VULCANIZING SPONGE RUBBER

Evelyn William Madge, Wylde Green, and Albert Arthur Round and Thomas Norcross, Erdington, Birmingham, England, assignors to Dunlop Rubber Company Limited, London, England, a British company Application December 10, 1937, Serial No. 179,054
In Great Britain December 24, 1936

8 Claims. (Cl. 260—793)

This invention relates to improvements in the vulcanization of goods of spongy or cellular rubber or the like material, and is particularly directed to the vulcanization of the said material when produced in a continuous manner.

It is well known that spongy or cellular rubber is an excellent thermal insulator. Consequently, difficulty is experienced in obtaining a uniform vulcanization of set frothed rubber dispersions owing to the poor conductivity of the set froth, particularly when appreciable thicknesses are employed. More particularly, it has been found very undesirable to vulcanize by dry heat since invariably this leads to over-vulcanization of the surface portions and under-vulcanization of the central portions of the set froth.

This difficulty may be overcome in known manner by vulcanizing the set froth in, for example, steam or a bath of boiling water. Under such conditions the set froth is maintained in a moistened state. These methods, however, have disadvantages in the continuous production of rubber goods, for example, in the continuous production of sponge rubber sheet by moulding and setting frothed aqueous rubber dispersions on a travelling belt, or in the production of moulded spongy or cellular rubber goods by moulding the frothed aqueous rubber dispersions in moulds attached to a travelling belt. Vulcanizing by means of steam under pressure in such processes is not practicable. When vulcanizing the set froth by means of a hot water bath, the horizontal travelling belt must change its direction of motion to enter the bath and to move submerged in the water. At such places the unvulcanized set froth is distorted and its cross-sectional dimensions are uncontrollably changed. Moreover, the set froth on account of its buoyant nature tends to leave the travelling belt and float on top of the water.

Our invention provides an improved method for the vulcanization of spongy or cellular goods of rubber and the like, which is particularly applicable to the production of said goods in continuous sheets or moulded form.

According to our present invention for the vulcanization of spongy or cellular rubber goods prepared from frothed aqueous emulsions or dispersions of rubber or similar material of the kinds hereinafter specified in sheet or moulded form, a set froth is passed, for example, in a mould with an open or partially open top, through a heated vulcanizing chamber into which is injected a heated aqueous medium in sufficient quantity and in such a condition to maintain the set froth in a wet condition.

In the vulcanization of sponge rubber sheet prepared in continuous manner by the method according to the present invention, the upwardly open mould may consist of a suitably formed travelling belt which may be provided with side walls in the form of travelling rubber bands. The method according to the present invention may also be applied to the vulcanization of moulded spongy or cellular rubber goods prepared in continuous manner. In this embodiment of the invention, the moulds are attached to a travelling belt. More particularly, the method according to the present invention may be employed for vulcanizing the spongy or cellular rubber goods in sheets or moulded form prepared in accordance with the process described in the co-pending application Ser. No. 179,042, filed December 10, 1937.

Preferably, the heated aqueous medium employed comprises boiling water or wet steam. The boiling water or wet steam is preferably uniformly sprayed on to the surface of the set froth through suitably spaced jets in the vulcanizing chamber. When wet steam is employed the steam vapour, is desired, may be recirculated, for example, by means of fans, and it may also be reheated by means of, for example, gas jets, in order to avoid excessive condensation.

The accompanying drawing illustrates an example of how the method according to the present invention may be carried out.

The sponge rubber sheet 1 is transported by means of two endless travelling belts 2 and 3 into the vulcanizing chamber 4. The upper belt 3 is perforated in accordance with the process described in the abovementioned co-pending application. The vulcanizing chamber 4 consists of a steam-heated chest 5 and a top cover 6. Steam is admitted through pipe 7 into pipe 8 inside the vulcanizing chamber, the pipe 8 having suitable spaced jets 9, 9 through which the steam is passed onto the surface of the sponge rubber sheet 1.

In order to conserve the steam supply, the steam is drawn by means of the fan 10 through the tubes 11, 11ª into the chamber 12. In this chamber, the water vapour is reheated by means of a gas burner therein, the gas being supplied through the pipe 13. The steam then re-enters the vulcanizing chamber through the discharge 14. The water which condenses in the vulcanizing chamber 4 runs into the sump 15, and is removed through the drain pipe 16.

The frothed aqueous emulsions or dispersions described in any of British patent specifications Nos. 332,525 (U. S. Patent 1,852,447), 332,526 and 431,410 may be employed, and the emulsions and dispersions which may be used are the same as those therein defined. It will be readily understood that in a method of vulcanization as herein described, the dispersions employed should preferably contain ultra-accelerators.

What we claim is—

1. A method for the vulcanization of spongy or cellular goods of foamed latex rubber in sheet or molded form which comprises passing said goods through a gaseous atmosphere containing water vapors, heating said atmosphere, and injecting into said atmosphere an aqueous medium in direct contact with said goods and in sufficient quantity and quality as to maintain the goods in a wet condition.

2. A method for the vulcanization of spongy or cellulose goods of foamed latex rubber in sheet or molded form which comprises passing said goods through a gaseous atmosphere containing water vapors in a chamber, transmitting heat through the walls of said chamber, and injecting into said chamber an aqueous medium in direct contact with said goods in sufficient quantity and quality as to maintain the goods in a wet condition.

3. The method of claim 1 in which said aqueous medium is hot water, and in which said hot water is sprayed onto said foam.

4. The method of claim 1 in which said aqueous medium is wet steam.

5. A method for the vulcanization of sheets of spongy or cellular goods of foamed latex rubber which comprises passing said sheets continuously through a gaseous atmosphere containing water vapors, heating said atmosphere, and injecting into said atmosphere an aqueous medium in direct contact with said goods in sufficient quantity and quality as to maintain the goods in a wet condition.

6. A method for the vulcanization of spongy or cellular goods of foamed latex rubber in sheet or molded form which comprises passing said goods through a gaseous atmosphere containing water vapors, injecting into said atmosphere and into contact with said goods an aqueous medium comprising water in finely divided liquid condition, and circulating said atmosphere while heating it.

7. The method of claim 1 in which said spongy or cellular goods are conveyed through the atmosphere during vulcanization in open molds.

8. A method for the vulcanization of spongy or cellular goods of foamed latex rubber which comprises passing said goods into a chamber having an atmosphere containing water vapor, maintaining the atmosphere of said chamber at a temperature sufficient to vulcanize said goods and supplying to said atmosphere an aqueous medium sufficient to maintain said goods in wet condition.

EVELYN WILLIAM MADGE.
ALBERT ARTHUR ROUND.
THOMAS NORCROSS.

CERTIFICATE OF CORRECTION.

Patent No. 2,200,847. May 14, 1940.

EVELYN WILLIAM MADGE, ET AL.

It is hereby certified that error appears in the printed specification of the above numbered patent requiring correction as follows: Page 2, first column, line 20, claim 2, for the word "cellulose" read --cellular--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.